(12) United States Patent
Fyke (10) Patent No.: US 8,102,367 B2
(45) Date of Patent: Jan. 24, 2012

(54) HANDHELD ELECTRONIC DEVICE INCLUDING A VARIABLE SPEED INPUT APPARATUS AND ASSOCIATED METHOD

(75) Inventor: Steven Henry Fyke, Waterloo (CA)

(73) Assignee: Motorola Mobility, Inc., Libertyville, IL (US)

( * ) Notice: Subject to any disclaimer, the term of this patent is extended or adjusted under 35 U.S.C. 154(b) by 669 days.

(21) Appl. No.: 12/246,941

(22) Filed: Oct. 7, 2008

(65) Prior Publication Data

US 2009/0040180 A1    Feb. 12, 2009

Related U.S. Application Data

(63) Continuation of application No. 11/058,593, filed on Feb. 15, 2005, now Pat. No. 7,450,106.

(51) Int. Cl.
*G09G 5/00* (2006.01)
*G06F 3/033* (2006.01)

(52) U.S. Cl. .............................. 345/156; 345/184

(58) Field of Classification Search .......... 345/156–160, 345/184
See application file for complete search history.

(56) References Cited

U.S. PATENT DOCUMENTS

| | | | |
|---|---|---|---|
| 5,736,703 A * | 4/1998 | Kim ........................... | 200/1 B |
| 2001/0024210 A1 | 9/2001 | Armstrong | |
| 2003/0076301 A1 | 4/2003 | Tsuk et al. | |
| 2003/0231164 A1 | 12/2003 | Blumer et al. | |

FOREIGN PATENT DOCUMENTS

| | | |
|---|---|---|
| EP | 0 685 951 A2 | 12/1995 |
| JP | 06-056932 | 8/1994 |

* cited by examiner

*Primary Examiner* — Kevin M Nguyen
*Assistant Examiner* — Cory Almeida (57) ABSTRACT

An improved handheld electronic device and method provide an input apparatus having a number of input members, at least a portion of the input members being movable among an unactuated position, a first actuated position, and a second actuated position in order to provide input. The improved method of enabling input into the handheld electronic device includes detecting a first input from a first input member, responsive to the first input, performing a first navigational function, such as a scrolling operation, at a first speed, detecting a second input form the first input member and, responsive to the second input, performing the first navigational function at a second speed, the second speed being different (e.g., greater) than the first speed. The input apparatus may include a substantially sealable, resilient membrane with the input members being disposed on the resilient membrane in order to provide an improved, ruggedized input apparatus.

20 Claims, 6 Drawing Sheets

HANDHELD ELECTRONIC DEVICE INCLUDING A VARIABLE SPEED INPUT APPARATUS AND ASSOCIATED METHOD

CROSS-REFERENCE TO RELATED APPLICATION

This is application is a continuation of U.S. application Ser. No. 11/058,593, entitled "Handheld Electronic Device Including a Variable Speed Input Apparatus and Associated Method," filed on Feb. 15, 2005.

BACKGROUND OF THE INVENTION

1. Field of the Invention

The invention relates generally to handheld electronic devices and, more particularly, to a variable speed input apparatus for a handheld electronic device. The invention also relates to a method of enabling input to a handheld electronic device using a variable speed input device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

As part of the user interface, certain handheld electronic devices employ a track wheel assembly having a wheel member which rotates in order to permit a user to scroll among and within the applications. In some such track wheel assemblies, the wheel member can be depressed slightly to provide an input which may be employed, for instance, to choose or select an application. Although the track wheel assembly provides variable speed scrolling capabilities proportional to the speed at which the wheel member is rotated, and is thus a relatively fast and efficient way to find and select a desired application, it also suffers from a number of disadvantages perpetrated by the nature of its design.

By way of specific example, without limitation, the wheel member of the track wheel assembly is pivotally disposed within an opening in the housing of the handheld electronic device. A number of gaps thus exist between the wheel member and the edges of the opening. These gaps provide points of entry allowing moisture, dirt and a wide variety of other undesirable matter to enter the device and potentially cause damage, or hinder operability of the device. In order to avoid the foregoing disadvantages, certain other handheld electronic devices have employed a number of directional buttons in an attempt to adequately replace the track wheel assembly. However, although employing such buttons may have reduced the size of the gaps surrounding the wheel member, and thus the problems generally associated therewith, it did not provide the same navigating experience and capabilities users have grown accustomed to with the track wheel assembly. For example, general directional buttons typically allow line by line scrolling by way of single button presses, and also often provide faster scrolling if, for example, the user holds the button down for a predetermined amount of time, but they do not provide the variable, user-controlled speed and operation provided by the track wheel.

There is, therefore, a need for a handheld electronic device having an input apparatus which is capable of substantially replicating at least some of the desirable operating characteristics (e.g., user-controlled variable speed) of a track wheel assembly, and which simultaneously overcomes at least some of the disadvantages associated with the design of the track wheel.

There is also a need for a method of enabling input into the handheld electronic device using the improved input apparatus.

SUMMARY OF THE INVENTION

These needs and others are satisfied by the inventive concept, which is directed generally to an improved variable speed input apparatus for a handheld electronic device. The variable speed input apparatus includes a navigational assembly having a resilient membrane and a number of input members and it provides an improved method of enabling input to the handheld electronic device using the input members. The improved input apparatus provides user-controlled navigation speed, and also enables the handheld electronic device to be ruggedized.

Accordingly, an aspect of the inventive concept is to provide an improved handheld electronic device and a method that facilitate navigation among a plurality of selectable applications or objects of the handheld electronic device.

Another aspect of the inventive concept is to provide an improved input apparatus and method which facilitate accurate and efficient variable speed scrolling among a plurality of selectable objects.

Another aspect of the inventive concept is to provide an improved handheld electronic device including a navigational assembly having a substantially sealed, resilient membrane in order to ruggedize the assembly and, therefore, resist damage caused, for example, by debris or moisture entering the handheld electrical device enclosure.

These and other aspects of the inventive concept are provided by an improved method of enabling input into a handheld electronic device, the handheld electronic device including an input apparatus having a number of input members, at least a portion of the input members of the number of input members being movable among an unactuated position, a first actuated position and a second actuated position in order to provide input. The general nature of the method can be stated as including detecting a first input from a first input member of the number of input members and, responsive to the first input, performing a first navigational function at a first speed. The method also includes detecting a second input from the first input member and, responsive to the second input, performing the first navigational function at a second speed, with the second speed being different than the first speed. For example, the second speed may be greater than the first speed. The method may further include detecting a third input from a second input member and, responsive to the third input, performing a second navigational function at a third speed, and detecting a fourth input from the second input member and, responsive to the fourth input, performing the second navigational function at a fourth speed. The first navigational function may include a scrolling operation in a first direction while the second navigational function may include the scrolling operation in a second direction, the second direction being different from the first direction. The method may include detecting a termination of the second input and, responsive to detecting the termination of the second input, performing the first navigational function at the first speed. The method may further include detecting a termination of the first input and, responsive to detecting the termination of the first input, terminating performance of the first navigational function.

The method may, therefore, include performing as the first navigational function, a scrolling operation to scroll among a plurality of selectable objects, detecting a termination of the first and second inputs and, responsive to detecting the termination of the first and second inputs, terminating the scrolling operation at a predetermined selectable object of the selectable objects. The method may further include detecting a selection input from a third input member of the number of input members and, responsive to detecting the selection input, processing the predetermined selectable object.

Other aspects of the inventive concept are provided by an improved handheld electronic device, the general nature of which can be stated as including a housing, a processor apparatus disposed within the housing and, an input apparatus. The processor apparatus comprises a processor and a memory. The input apparatus is cooperable with the processor and comprises a number of input members, at least a portion of the input members of the number of input members being movable among an unactuated position, a first actuated position, and a second actuated position in order to provide input to the processor. The processor is adapted to detect a first input from a first input member of the number of input members and, responsive to detecting the first input, to perform a first navigational function at a first speed. The processor is further adapted to detect a second input from the first input member and, responsive to detecting the second input, to perform the first navigational function at a second speed, the second speed being different than the first speed. The memory may include a plurality of routines representative of selectable objects. The first navigational function may be a scrolling operation to scroll among the plurality of selectable objects, wherein the processor is adapted to detect a termination of the first and second inputs and, responsive to detecting the termination of the first and second inputs, to terminate the scrolling operation at a predetermined selectable object of the selectable objects.

The input apparatus may further comprise a resilient membrane disposed within a aperture of the handheld electronic device housing, with at least some of the input members of the number of input members being disposed on the resilient membrane, a communications element disposed within the housing proximate the aperture, the communications element including a plurality of electrical contacts in communication with the processor, and a number of conductors, at least a first conductor of the number of conductors being disposed on one of the resilient membrane, one of the number of input members, and the communications element. The at least a first conductor is structured to be engaged with another one of the resilient membrane, the one of the number of input members, and the communications element, wherein, responsive to being engaged, the at least a first conductor is structured to electrically, conductively connect a set of the plurality of electrical contacts to generate the input to the processor.

BRIEF DESCRIPTION OF THE DRAWINGS

A full understanding of the inventive concept can be gained from the following Description of the Preferred Embodiment when read in conjunction with the accompanying drawings in which.

Similar numerals refer to similar parts throughout the specification.

DESCRIPTION OF THE PREFERRED EMBODIMENT

For simplicity of disclosure, the inventive concept will be described and illustrated as applied to a navigational assembly enabling navigational inputs in order to, for example, scroll among a plurality of selectable objects of a handheld electronic device, although it will be understood that it could also be applied to any input apparatus enabling any type of input into any type of electronic device.

Directional phrases used herein such as, for example, top, bottom, left, right, up, down, and derivatives thereof, relate to the orientation of the elements in the drawings and are not limiting upon the claims unless expressly recited therein.

Figure 1:
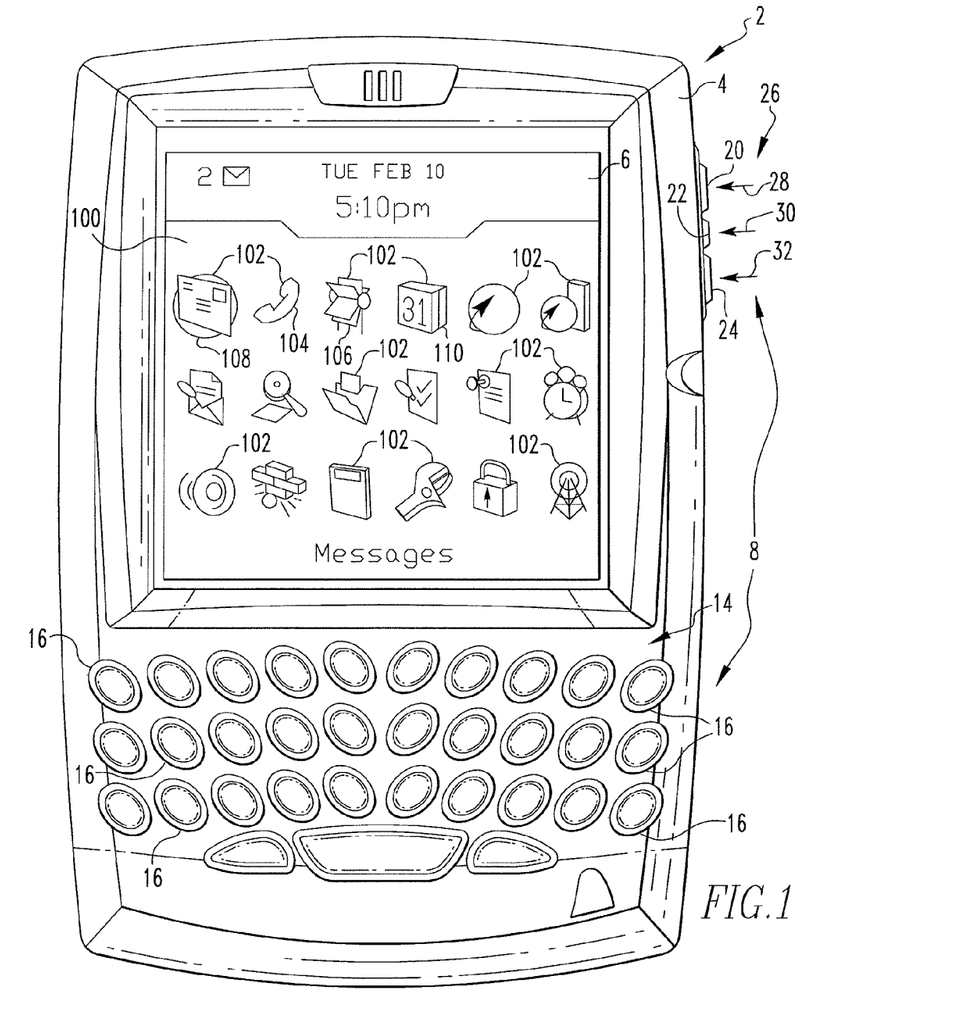
FIG. 1 is a top plan view of an improved handheld electronic device and navigational assembly, in accordance with the invention.
Figure 2:
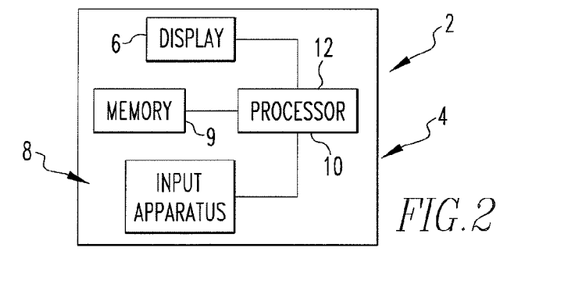
FIG. 2 is a block diagram of the handheld electronic device of FIG. 1.

An improved handheld electronic device 2 in accordance with the inventive concept is shown in FIG. 1 and is depicted schematically in FIG. 2. The handheld electronic device 2 includes a housing 4, a display 6, an input apparatus 8 and, processor apparatus comprising a memory 9 and a processor 10. The processor 10 may be, without limitation, a microprocessor (μP). The processor 10 has software 12 that resides in the handheld electronic device 4 and provides functionality to inputs received from the input apparatus 8 and provides outputs to the display 6. The memory 9 is cooperable with the processor 10 and may be any of a variety of internal and/or external storage media including, without limitation, RAM, ROM, EPROM, EEPROM, and/or the like. Examples of handheld electronic devices are included in U.S. Pat. Nos. 6,452,588 and 6,489,950, which are incorporated by reference herein.

In the example of FIG. 1, the exemplary input apparatus 8 includes a keyboard 14 and a navigational assembly 26. The keyboard 14 has a plurality of keys 16. The navigational assembly 26 has a number of input members 20,22,24 and a resilient membrane 34. In the present example, the input members include three keys, a first directional key 20, a selection key 22 and, a second directional key 24, which are all disposed on a side of the housing 4, as shown. It will be appreciated, however, that any suitable number of input members could be employed in any suitable configuration, with or without the resilient membrane 34. As used herein, the expression "key" and variations thereof refer broadly to any of a variety of suitable input members such as, for example, without limitation, buttons, switches, combinations of buttons and switches, and any other known or suitable input member. The expression "a number of" and variations thereof, as employed herein, refers broadly to one or more than one (i.e., a plurality).

As will be discussed in greater detail hereinbelow, the keys 20,22,24 of the navigational assembly 26 are input members of the input apparatus 8. Each of the input members 20,22,24 is movable to generate input to the processor apparatus. Responsive to detecting the input, the processor 10 executes a predetermined routine of a plurality of routines which are representative of selectable objects of the handheld electronic device 2. The plurality of selectable objects are stored in the memory 9. As used herein, the expression "object" refers to any type of function, process, application, task, procedure, routine, subroutine, function call, or other type of software or firmware operation that can be executed by the processor 10 (FIG. 2) of the handheld electronic device 2.

In FIG. 1, the display 6 is depicted as displaying a home screen 100 that includes a number of applications, or selectable objects, depicted as discrete icons 102, including, without limitation, an icon representing a telephone application 104, an address book application 106, a messaging application 108 which may include email, SMS and MMS applications, and a calendar application 110. In FIG. 1, the home screen 100 is currently active and would constitute a portion of an application. Other applications, such as phone application 104, address book application 106, messaging application 108, and calendar application 110 can be initiated from the home screen 100 by providing a selection through the input apparatus 8, such as by actuating one of the keys 20,22, 24 of the exemplary navigational assembly 26 in the corresponding directions indicated generally by arrows 28,30,32 of FIG. 1.

Figure 3:
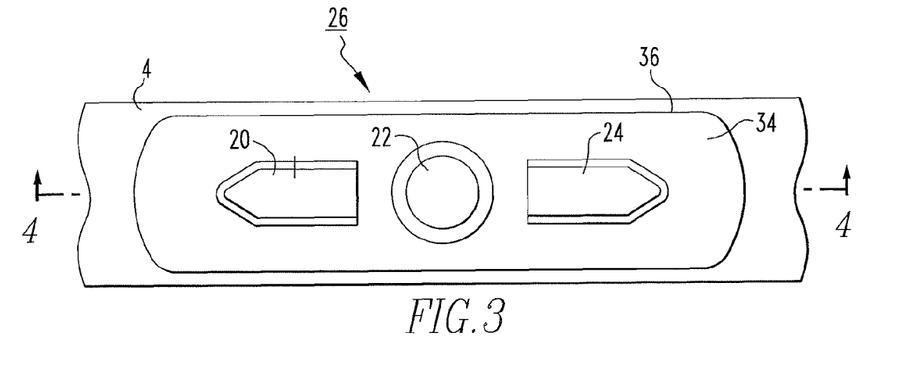
FIG. 3 is a side view of a portion of the handheld electronic device and the navigational assembly of FIG. 1.
Figure 4:
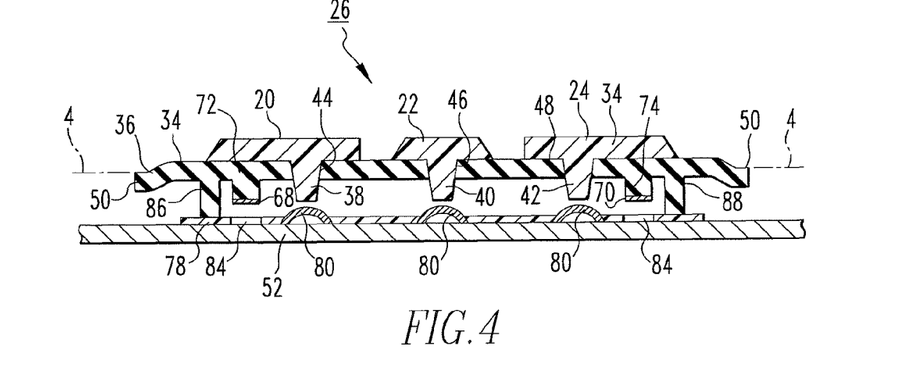
FIG. 4 is a cross-sectional view taken along line 4-4 of FIG. 3, showing the input members of the navigational assembly in their unactuated positions.
Figure 5:
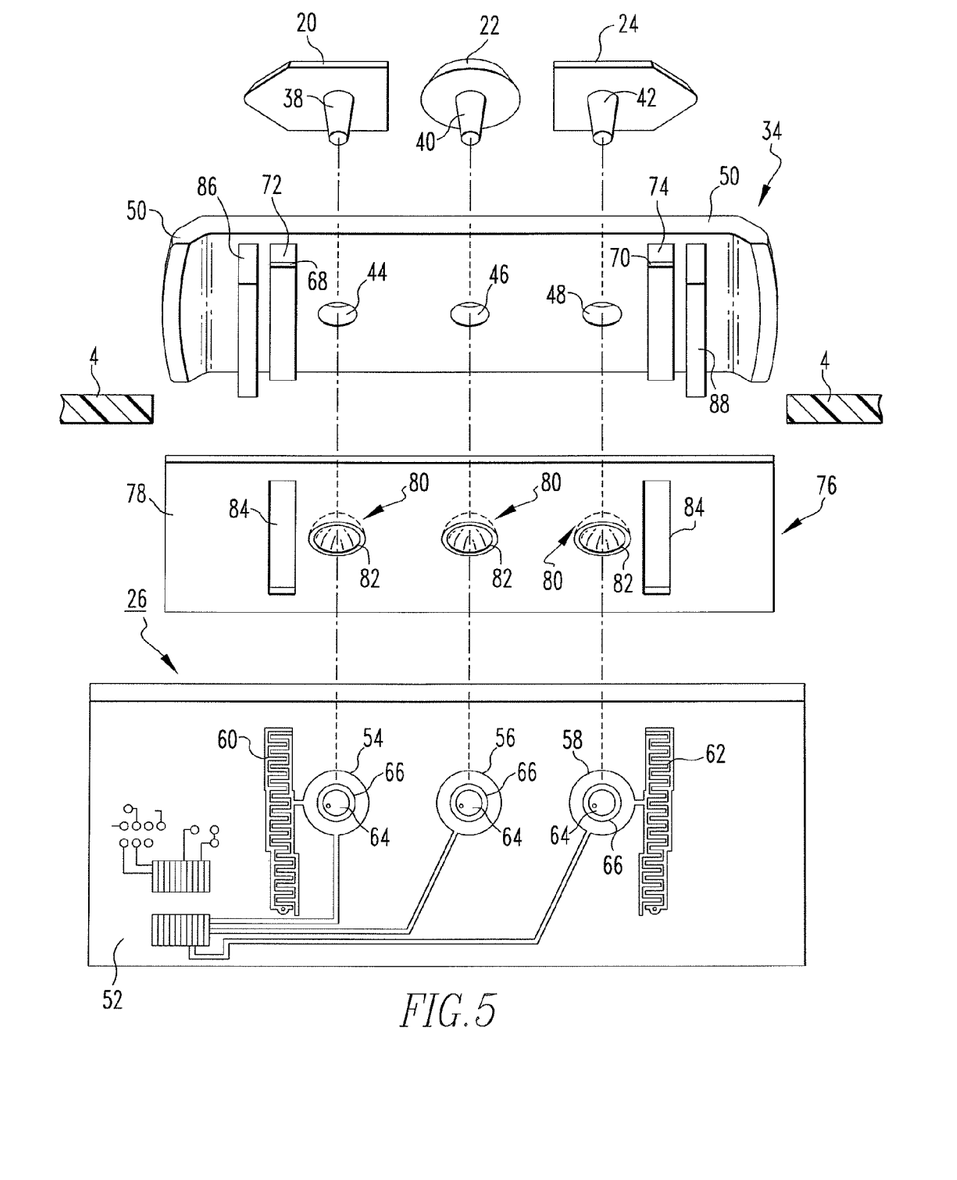
FIG. 5 is an exploded, perspective view of the navigation assembly of FIG. 4.

FIGS. 3-5 further illustrate the navigational assembly 26 and the exemplary first directional key 20, central selection key 22, and second directional key 24, which is disposed opposite the first directional key 20. As will be discussed in greater detail herein, the exemplary first directional key 20 is deflectable among an unactuated position, shown in FIG. 4, a first actuated position, shown in FIG. 6, and a second actuated position, shown in FIG. 7, to provide input to the processor 10. The processor 10, responsive to the input, executes a routine to perform a first navigational function which in the present example is a scrolling operation in a first direction. The second directional key 24 is deflectable in a mirror-image fashion with respect to the first direction key 20. The second directional key is thus deflectable among an unactuated position, shown in FIG. 4, and first and second actuated positions to generate input to the processor 10. The processor 10, responsive to the input generated by the second directional key executes a routine to perform a second navigational function which, in the present example, is a scrolling operation in a second direction opposite the first direction. This will be further understood with reference to FIG. 8, described hereinbelow.

The exemplary third input member is a selection key 22 which is movable between an unactuated position (FIG. 4) and an actuated position in which a selection input is provided to the processor 10 (FIG. 2). Accordingly, the first and second directional keys 20,24 of the improved navigational assembly 26 are used to provide inputs to a navigational routine that performs a scrolling operation such as might be indicated by movement of a cursor (see, for example, cursor 90 of FIG. 8) or highlight among the selectable objects. Once a predetermined object of the selectable objects is found, the selection key 22 can be actuated to provide a selection input to the processor 10 which, in response to the selection input, will execute a routine representative of the selected object.

As best shown in FIGS. 4 and 5, each of the exemplary keys 20,22,24 has a corresponding projection 38,40,42 disposed within an associated opening 44,46,48 of the resilient membrane 34. However, it will be appreciated that the keys 20,22, 24 may be secured to the resilient membrane 34 in any known or suitable manner. For example, without limitation, they may be glued or otherwise adhered to the resilient membrane 34 using an adhesive, or they might be press welded to the membrane 34. The keys could also be formed as an integral part of the membrane (not shown).

The resilient membrane 34 is disposed within an aperture 36 of the handheld electronic device enclosure 4, thus providing a barrier between the keys 20,22,24 and an interior region of the housing 4 to resist the entry of debris into the housing 4. In this manner, the improved handheld electronic device 2 of the invention can be ruggedized. In other words, not only does the exemplary membrane 34 provide a resilient and robust design capable of withstanding impact caused, for example, by dropping the handheld electronic device 2, but it is also further ruggedized in the sense that it provides moisture and particulate matter resistance enabling the device 2 to be employed without concern in inclement weather or at the beach, for example. In the example of FIGS. 4 and 5, the resilient membrane 34 further includes a lip 50 substantially extending around the periphery of the membrane 34. The lip 50 is structured to be disposed under the edge of the housing aperture 36 and, in particular, around the perimeter of the aperture 36. The lip 50 may but need not necessarily be secured (e.g., without limitation, glued; press welded) to an inner surface of the housing 4 proximate the aperture 36 therein (best shown in FIG. 4). In this configuration, the improved navigational assembly 26 of the inventive concept is even further ruggedized by, for example, substantially sealing the aperture 36. The improved handheld electronic device 2 of the inventive concept can therefore, be made essentially waterproof. Although the exemplary resilient membrane 34 is contemplated as being made from rubber, it will be understood that it could alternatively be made from any known or suitable resilient and durable material.

Continuing to refer to FIGS. 4 and 5, it will be understood that the exemplary navigational assembly 26 further includes a communications element, such as the printed circuit board (PCB) 52. The PCB 52 includes a plurality of contacts (best shown in FIG. 5). Specifically, as best shown in FIG. 5, the PCB 52 includes a plurality of primary contacts and a plurality of secondary contacts. Three sets of primary contacts 54,56,58 and two sets of secondary contacts 60,62 are shown in FIG. 5. Each set of contacts 54,56,58 includes a ball contact 64 and a ring contact 66 extending concentrically about the ball contact 64. The exemplary sets of secondary contacts 60,62 are aligned, respectively, with carbon pills 68,70 disposed on first and second protrusions 72,74 of the resilient membrane 34 and are generally of an intermeshed comb arrangement, as shown. In the exemplary embodiment of the PCB 52 depicted in FIG. 5 and described herein, certain of the sets of primary contacts (e.g., 54,58) are electrically connected with leads to certain of the secondary contacts 60,62. It will be appreciated, however, that a wide variety of other contact configurations (not shown) could be employed without departing from the concept of the invention. It will also be appreciate that, while the exemplary secondary contacts 60,62 are contemplated as being metallic traces, that any known or suitable contact material (e.g., without limitation, copper traces; gold traces) in any suitable configuration, could be employed. The same is true with regard to the exemplary carbon pills 68,70.

As shown in FIGS. 4 and 5, the exemplary navigational assembly 26 further includes a primary conductor panel 76 which generally comprises a spacer 78 and a plurality of conductive domes (three conductive domes 80 are shown in FIG. 5) disposed on the spacer 78. The spacer 78 further includes a plurality of primary holes (generally shown as reference 82 in FIG. 5) formed therein. The apex of each dome 80 (i.e., the proud portion thereof) extends through a corresponding primary hole 82, as shown, and the circular edge of each dome 80, opposite the apex thereof, protrudes outwardly from and beyond the associated primary hole 82. The circular ends of the domes 80 rest on the ring contacts 66 of the primary contacts 54,56,58, when assembled (not shown). It will be understood that the domes 80 may be adhered or otherwise connected to the spacer 78 in any known or suitable manner, for example, by way of adhesive members (not shown). It will also be understood that in other embodiments, the domes 80 and the spacer 78 might not be connected together at all, without departing from the concept of the invention.

Figure 6:
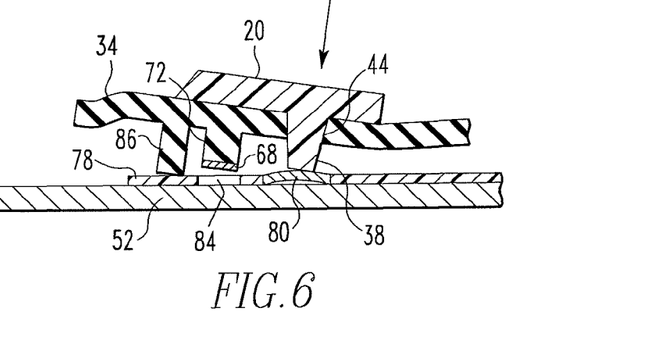
FIG. 6 is a cross-sectional view of the left input member (from the perspective of FIG. 4) modified to show the input member in a first actuated position.
Figure 7:
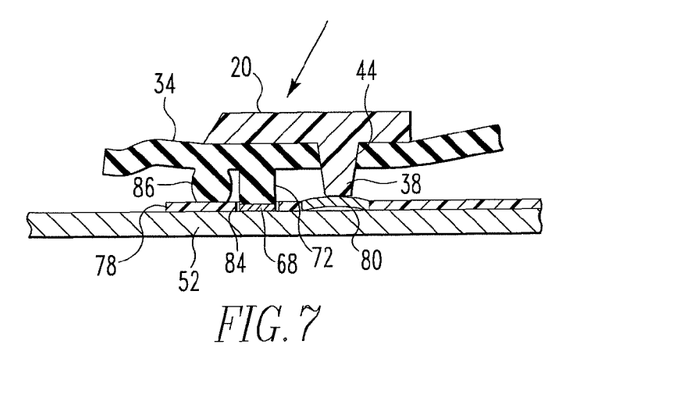
FIG. 7 is a cross-sectional view of the input member of FIG. 6 modified to show the input member in a second actuated position.

The domes 80 are elastically deflectable between an undeflected position (FIG. 4), and a deflected position (FIGS. 6 and 7). The movement of the domes 80 between the undeflected and deflected positions occurs via elastic deformation of the domes 80 and causes the domes 80 to "snap" between the undeflected and deflected conditions to provide a desirable tactile feedback. The spacer 78 further includes a plurality of elongated secondary holes 84 that correspond generally with the arrangement of the carbon pills 68,70 on the resilient membrane protrusions 72,74. In the exemplary embodiment, the spacer 78 is a thin sheet of an insulative material, such as plastic, although other configurations are possible. It is also understood that the navigational assembly 26 could potentially be alternatively configured in a manner that would eliminate the need for the spacer 78 but would still be considered to be within the scope of the invention.

In the exemplary embodiment of the navigational assembly 26 shown and discussed herein, each of the directional keys 20,24 is associated with one of the domes 80 and with one of the secondary conductors 60,62 (e.g., metallic traces 60,62 disposed on PCB 52, best shown in FIG. 5) and the selection key 22 is associated only with a dome 80. In FIG. 4, the keys 20,22,24 are each depicted as being in an initial position which corresponds with the undeflected position of the associated dome 80 and the undeflected positions of the associated carbon pills 68,70, which are disposed on the resilient membrane 34 and are also movable between an undeflected position and a deflected position. In other words, in the initial position, the entire resilient membrane 34 is substantially undeflected, as shown in FIG. 4.

The exemplary resilient membrane 34 further includes first and second collapsible columns 86,88 which project from and support the membrane 34 proximate the first and second protrusions 72,74 having carbon pills 68,70, respectively. Thus, in the initial unactuated position of FIG. 4, the collapsible columns 86,88 function to space the carbon pills 68,70 from the sets of secondary contacts 60,62 (FIG. 5) of the PCB 52. The collapsible columns 86,88 are, therefore, longer than the protrusions 72,74 best shown in FIG. 4, but are structured to collapse or otherwise deflect as shown, for example, in FIG. 7, in response to an actuation of the associated directional key (e.g., directional key 20 of FIG. 7) to the second actuated position, shown in FIG. 7. In this manner, the carbon pill 68 of protrusion 72 can be brought into contact with the associated set of secondary contacts 60 on the PCB 52 thus completing a circuit or a portion of a circuit and providing input to the processor 10 of FIG. 2. It will be appreciated that any known or suitable support other than the exemplary collapsible columns 86,88, could alternatively be employed. It will also be appreciated that all of the aforementioned components of the navigational assembly 26 can be adhered together or otherwise attached to one another. Alternatively, in other embodiments of the invention, the components need not be adhered to one another in any fashion.

Referring to FIGS. 6 and 7, a discussion of the operation of the keys 20,22,24 (FIG. 5) will now be provided.

For simplicity of disclosure, only one key (e.g., first directional key 20) is shown and discussed in FIGS. 6-7. It will be understood that operation of the second directional key 24 (FIG. 5) is nearly identical except with respect to the user-supplied motions being in opposite directions as those supplied to actuate the first directional key 20. It will also be generally understood that the selection key 22, in the embodiment shown and discussed herein, is structured to only be depressable inward (with respect to housing 4 of FIG. 4) and to provide a selection input and a tactile feedback, although other actions could be employed.

Referring now to FIG. 6, when the directional key 20 is depressed straight toward the PCB 52, projection 38 of the key 20 engages the dome 80 that is associated with the key 20 and elastically collapses the dome 80 to the deflected position. However, the resilient membrane 34 is not sufficiently deflected so as to collapse the collapsible column 86 therefore, the carbon pill 68 associated the dome 80 does not engage the metallic trace 60 (FIG. 5) on the PCB 52. In the example of FIG. 6, the key is in the first actuated position, and thus it can be seen that the directional key 20 is movable between the initial unactuated position and the first actuated position.

In response to the key 20 being in the first actuated position, the associated dome 80 is in the deflected position in which it contacts the ball contact 64 (FIG. 5) of the associated primary contact 54. The domes (e.g., 80) are primary conductors which, when engaged with a corresponding set of primary contacts (e.g., 54), electrically connect together the ball contact 64 and the ring contact 66 of the set, in order to complete a circuit or to complete an open portion of a circuit. This in turn generates the input associated with the first actuated position of the key 20 and, provides the input to the processor 10 in order to execute the routine for providing the first navigational function (e.g., scrolling in a first direction (best shown in FIG. 8)). As previously discussed, the dome 80 is configured to "snap" when moving between its undeflected position, shown in FIG. 4, and its deflected position, shown in FIG. 6. Such "snap" provides a desirable tactile feedback to the user.

As shown in FIG. 7, the first directional key 20 is also movable to the second actuated position which generates the second input to the processor 10. In response, the processor 10 executes the routine corresponding to the exemplary first scrolling operation navigational function at a second speed, which is greater than the first speed associated with the input provided to the processor 10 by the key 20 when the key 20 is in the first actuated position. More specifically, when the key 20 is in the second actuated position, shown in FIG. 7, the associated dome 80 is in its deflected position. The resilient membrane 34 is also deflected such that the collapsible column 86 associated with the key 20 is in a deflected or compressed position, as shown. As shown in FIG. 5, this permits the carbon pill 68 on the protrusion 72 to engage its associated set of secondary contacts 60 on the PCB 52. It will, of course, be understood that, in the embodiment shown herein and, in particular, in FIG. 5, this entails the carbon pill 68 being disposed through the associated secondary hole 84 of the exemplary spacer 78. Each carbon pill (e.g., 68) thus serves as a secondary conductor that is engageable with a set of secondary contacts (e.g., 60) for the purpose of electrically connecting together the secondary contacts and completing a circuit or an open portion of a circuit. In the example shown and discussed herein, such completed circuit provides an input to a routine associated with an increase in the rate at which the first navigational function is performed. Thus, the inventive concept, through the combination of the first actuated position, shown in FIG. 6, and the second actuated position, shown in FIG. 7, provides the user with variable speed control.

As shown in FIG. 5, the carbon pills 68,70, as previously discussed, are mounted on the protrusions 68,70 of the resilient membrane 34 which is flexible, and deflects to move the carbon pills 68,70 between the undeflected position, shown in FIGS. 4 and 6, and the aforementioned deflected position, shown in FIG. 7. The carbon pills 68,70 in their deflected positions extend through the associated secondary holes 84 in the spacer 78 of FIG. 5. In the exemplary embodiment depicted herein, the carbon pills 68,70 do not "snap" or otherwise proved a discrete tactile feedback to the user. However, some feedback to the user is acceptable, such as the slight additional finger force required to elastically deflect or collapse the collapsible columns 86,88 between the undeflected position, shown in FIG. 6, and deflected position, shown in FIG. 7. In other embodiments, the carbon pills 68,70 or other known or suitable secondary conductor can be configured to provide specific tactile feedback to the user in moving between the undeflected and deflected positions, without departing from the concept of the invention.

As shown in FIG. 6, the directional key 20, in the exemplary first actuated position, is pivoted slightly in a direction indicated generally by the arrow (e.g., clockwise from the perspective of FIG. 6). When moved to the exemplary second actuated position, as shown in FIG. 7, the key 20 is pivoted slightly in a direction away from the first actuated position as indicated generally by the arrow of FIG. 7 (e.g., counterclockwise with respect to the first actuated position of FIG. 6).

Therefore, each directional key 20,24 is movable between the initial position and a plurality of actuated positions such as the first and second actuated positions of FIGS. 6 and 7, respectively. The actuated positions are associated with inputs provided to the processor 10 by way of the various engagements of the domes 80 and the carbon pills 68,70 and, in response to the inputs, the processor 10 executes a corresponding routine and performs the exemplary scrolling operation in the desired direction and at the desired speed.

EXAMPLE

Figure 8:
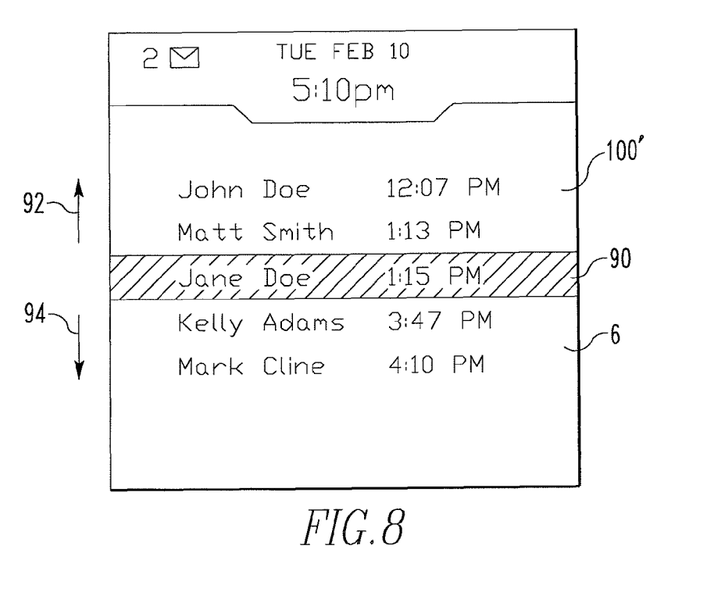
FIG. 8 is a top plan view of the display of the handheld electronic device.

With reference to FIG. 8, a representative example of a navigational function, provided by way of the improved navigational assembly 26 of the inventive concept, will now be discussed. The display 6 of the handheld electronic device 2 (FIG. 1) in the example of FIG. 8 depicts a screen 100' showing a listing of recent telephone calls which have been made from and received by the device 2. In the example of FIG. 8, the screen 100' shows five names of individuals to which or from whom the recent call was made or received and the name Jane Doe is highlighted by a cursor 90.

In operation, the directional buttons 20,24 (FIG. 3-7) of the exemplary navigational assembly 26 (FIGS. 3-7) and the processor 10 provide the ability to, for example, navigate (e.g., scroll) the cursor 90 among the names at a plurality of speeds corresponding to the actuated position among the plurality of actuated positions of the directional keys 20,24. Thus, responsive to an actuation of the first directional key 20 (FIGS. 1 and 3-7) to the first actuated position, a scrolling operation is initiated at a first speed, for example, at a count or rate of one line per actuation, in the direction indicated by arrow 92 (e.g., up from the perspective of FIG. 8). Responsive to the key 20 being held in the first actuated position, the scrolling operation is continuous at the first speed. Responsive to the key 20 being further depressed or actuated to the second actuated position (FIG. 7), the scrolling operation continues in the same direction (i.e., up), but the scrolling speed is increased, for example, to a rate of three or more lines per actuation. Holding the key 20 in the second actuated position provides continuous scrolling at the increased speed. It will, however, be appreciated that the first and second actuated positions could provide input for the execution of one or more routines to perform the navigational function at any predetermined scrolling rate. It will also be appreciated that any number of additional actuated key positions (not shown) could be included to provide inputs which enable even further variation in the speed of the scrolling operation. It will further be appreciated that the navigational assembly 26 could be configured such that holding the key 20 (FIGS. 1 and 3-7) down for example, in the first actuated position, for a predetermined amount of time provides an additional change (e.g., increase) in speed.

Partially releasing the directional key 20 such that it returns to the first actuated position (FIG. 6), as previously described, results in the speed of the scrolling operation slowing back down to the first speed and releasing the key 20 entirely stops the cursor 90. As previously discussed, the second directional key 24 (FIGS. 1 and 3-7) functions in substantially the same manner as the first directional key 20 to provide inputs which enable scrolling in the opposite direction, as indicated generally by arrow 94 of FIG. 8 (e.g., down from the perspective of FIG. 8). In this manner, a user may control the speed and accuracy with which they scroll or otherwise navigate among a plurality of selectable objects or entries (e.g., recent calls). Once the predetermined one of the selectable objects or entries is successfully found and, for example, highlighted by the cursor 90, the selection button 22 (FIGS. 1 and 3-7) is deflected to its first actuated position (not shown) in order to generate and provide the selection input to the processor 10 which in turn executes a routine representative of the object or entry, as previously described.

Figure 9A:
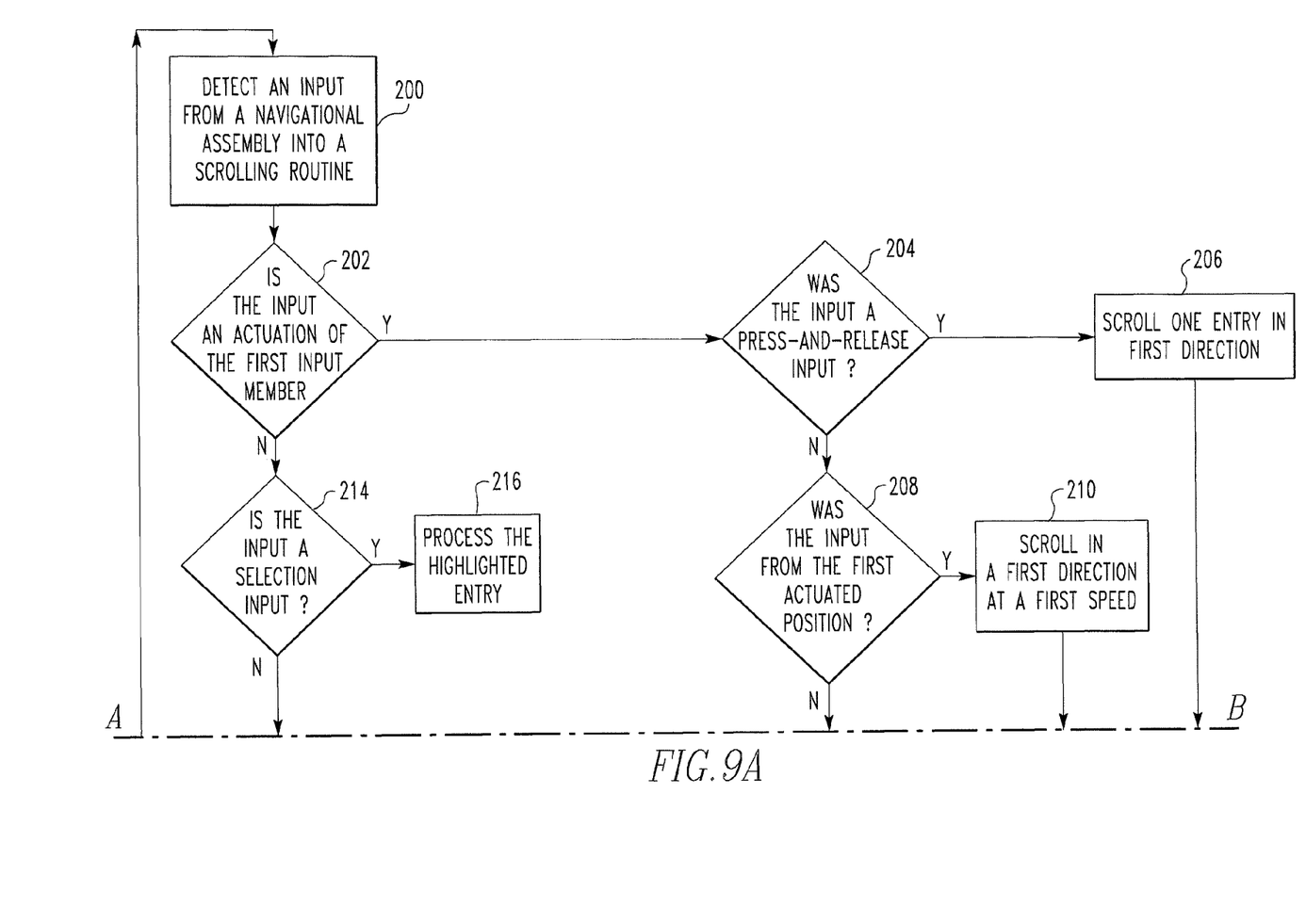
FIGS. 9A and 9B are a flow chart depicting a method of enabling input in accordance with the invention.
Figure 9B:
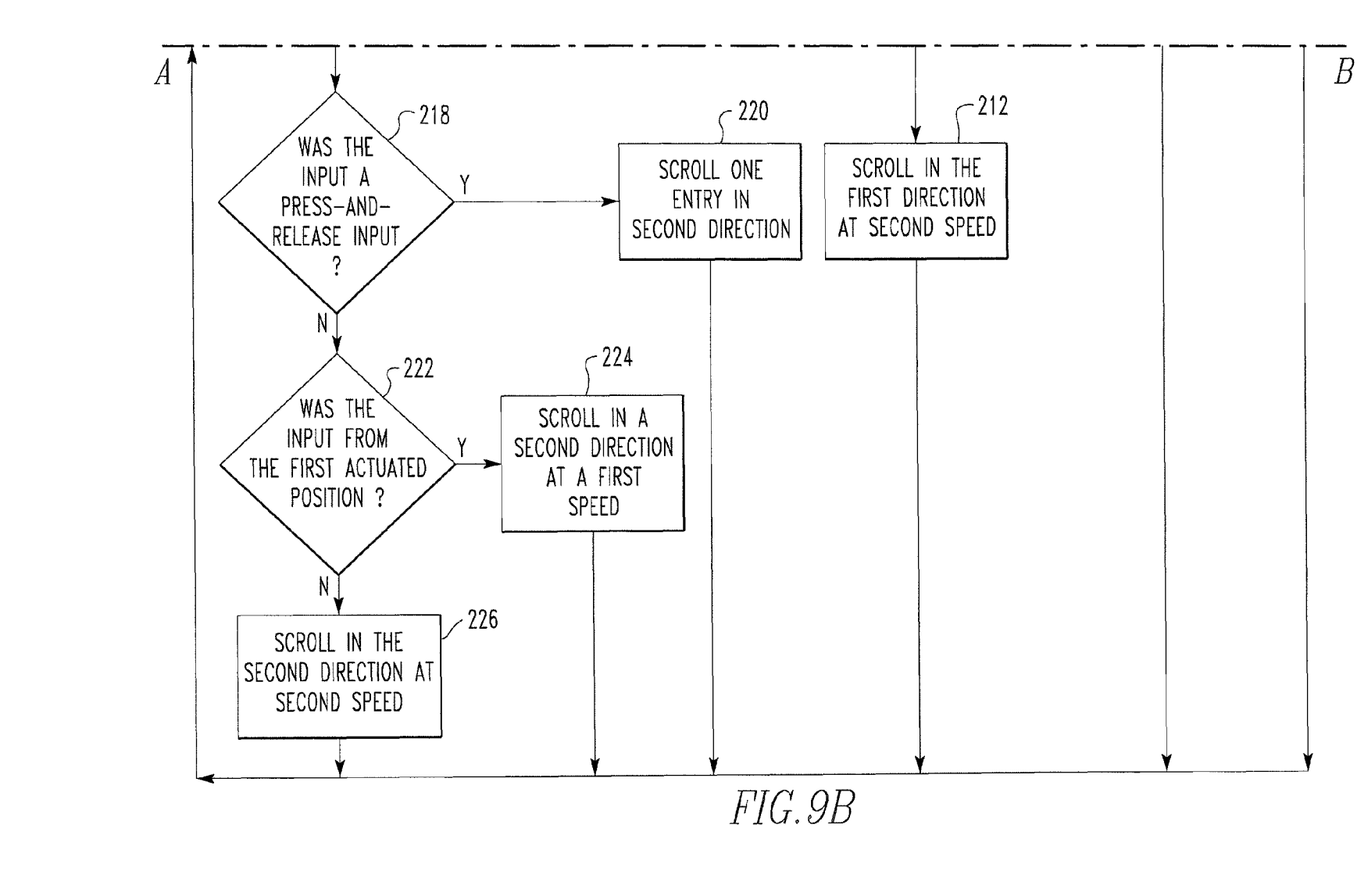

An exemplary flow chart is depicted in FIGS. 9A and 9B as representative of the improved method of enabling input into the handheld electronic device 2 in accordance with the inventive concept. As shown, the processor 10 (FIG. 2), at 200, detects an input from the navigational assembly 26 (FIG. 1) into a scrolling routine. At 202, the processor 10 detects whether the input was an actuation of the first input member which, in the present example, is the first directional key 20. If the input was an actuation of the first directional key 20, at 204, the processor 10 detects whether it was a press-and-release input. At 206, if it was a press-and-release input of the first directional key 20, the processor 10 executes the scrolling operation one entry in a first direction. For instance, with reference to the EXAMPLE discussed previously with respect to FIG. 8, this could involve scrolling upward one name from the name Jane Doe to the name Matt Smith. The method of enabling input then starts over again at step 200, as shown.

Referring again to step 202, the processor 10 may detect that the input was not an actuation of the first directional key 20, but instead an actuation of another input member, such as the selection key 22 or the second directional key 24. Specifically, at 214, the processor 10 detects whether or not the input was a selection input generated for by the exemplary selection key 22. If it was, at 216, the processor 10 will execute the routine corresponding to the highlighted entry. Alternatively, if at 214, the processor 10 detects that the input was not a selection input, the input was, in the present example, generated by the second directional key 24. Responsive to detecting the input generated by an actuation of the second directional key 24, the processor 10, at 218, detects whether the input was a press-and-release input. If it was, at 220, the processor 10 executes a routine to scroll one entry in the second direction which, as previously discussed with respect to the foregoing EXAMPLE, is opposite the first direction. If, at 218, the processor detects that the input was not a press-and-release input but instead a hold of the second directional key 24, for example, the processor, at 222, will detect whether the input was generated from the key 24 being disposed in the first actuated position. If the input was generated by the key 24 being actuated to the first actuated position, the processor 10 will provide a scroll in the second direction at the first speed, at 224. If it was not, the processor 10, at 226, will provide a scroll in the second direction at the second speed.

It will be appreciated that the processor 10, as previously described can also detect termination of an input responsive to the input members (e.g, 20) being released. Responsive to such a termination, the processor 10 will stop the current scrolling operation. Specifically, if the termination input was a release of the input member 20 from the first actuated position the processor 10 will stop the scrolling operation and, if the termination is a release of the input member 20 from the second actuated position to the first actuated position, the processor 10 will detect the input corresponding to the input member 20 being actuated to the first actuated position and, in response thereto, will provide the scrolling operation at the first speed.

In the present example, actuation of the first directional key 20 to the first and second actuated positions provides first and second inputs, respectively, to the processor 10, the actuation of the selection key 22 to an actuated position provides a selection input to the processor 10 and, the actuation of the second directional key 24 to the first and second actuated positions thereof, provides third and fourth inputs, respectively, to the processor 10. The first and second inputs are inputs to a scrolling routine to scroll in a first direction at first and second speeds, respectively. The third and fourth inputs are inputs to a scrolling routine to scroll in a second direction opposite the first direction, at third and fourth speeds. In the present example, the third and fourth speeds are equivalent to the first and second speeds, respectively. However, it will be appreciated that a wide variety of alternative input combinations could be employed.

It will also be understood that foregoing steps may occur rapidly, such as by way of the user rapidly actuating the keys (e.g., first directional key 20) between its second (FIG. 7) and first (FIG. 6) actuated positions, and/or releasing the key 20. Alternatively, the steps of the method of enabling input may occur relatively slowly, such as by the user delaying between each actuation or termination. Accordingly, the navigational assembly 26 (FIGS. 1 and 3-5) of the inventive concept provides a user controlled, variable speed navigational capability. It will also be appreciated that navigational functions or operations such as, for example, a reverse scroll or scroll in the opposite direction from the initial scrolling operation, can be initiated by the user, for example, in order to back up or reverse when the desired object or entry was accidentally passed over.

Accordingly, the improved method of enabling input and navigational assembly of the inventive concept provide a ruggedized and robust navigational tool which provides substantial user-controlled variable speed navigational capabilities.

While specific embodiments of the inventive concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of enabling input into a handheld electronic device, the handheld electronic device including a housing, an input apparatus having a number of input members and a resilient membrane being disposed within an aperture of the housing, at least some of the input members of the number of input members being disposed on the resilient membrane, at least a portion of the input members of the number of input members being movable among an unactuated position, a first actuated position, and a second actuated position in order to provide input, the method comprising:
   actuating a first input member of the number of input members to its first actuated position, thereby deflecting the resilient membrane to a first position and effectuating a first input;
   detecting the first input;
   responsive to the first input, performing a first navigational function at a first speed;
   actuating the first input member to its second actuated position, thereby deflecting the resilient membrane to a second position and effectuating a second input;
   detecting the second input; and
   responsive to the second input, performing the first navigational function at a second speed, the second speed being different than the first speed,
   wherein the first navigational function is performable at the second speed upon detecting as the second input an actuation of the first input member from the unactuated position directly to the second actuated position.

2. The method of claim 1, further comprising detecting as the second input an actuation of the first input member from its first actuated position to its second actuated position.

3. The method of claim 1, further comprising performing the first navigational function at the second speed by performing the first navigational function at a speed greater than the first speed.

4. The method of claim 1, further comprising:
   actuating a second input member of the number of input members to its first actuated position, thereby deflecting the resilient membrane to a third position and effectuating a third input;
   detecting the third input; and
   responsive to the third input, performing a second navigational function at a third speed.

5. The method of claim 4, further comprising
   actuating the second input member of the number of input members to its second actuated position, thereby deflecting the resilient membrane to a fourth position and effectuating a fourth input;
   responsive to the fourth input, performing the second navigational function at a fourth speed.

6. The method of claim 5, further comprising: detecting as the fourth input an actuation of the second input member from its first actuated position to its second actuated position.

7. The method of claim 5, further comprising detecting as the fourth input an actuation of the second input member from its unactuated position directly to its second actuated position.

8. The method of claim 4, further comprising:
performing as the first navigational function, a scrolling operation in a first direction; and
performing as the second navigational function, a scrolling operation in a second direction, the second direction being different from the first direction.

9. The method of claim 4, further comprising performing the second navigational function at the third speed by performing the second navigational function at a speed equal to the first speed.

10. The method of claim 1, further comprising:
detecting a termination of the second input; and
responsive to detecting the termination of the second input, performing the first navigational function at the first speed.

11. The method of claim 10, further comprising:
detecting a termination of the first input; and
responsive to detecting the termination of the first input, terminating performance of the first navigational function.

12. The method of claim 1, further comprising:
performing as the first navigational function, a scrolling operation among a plurality of selectable objects;
detecting a termination of the first and second inputs;
responsive to detecting the termination of the first and second inputs, terminating the scrolling operation at a predetermined selectable object of the selectable objects.

13. The method of claim 12, further comprising:
actuating a third input member of the number of input members, thereby deflecting the resilient membrane and effectuating a selection input;
detecting the selection input; and
responsive to detecting the selection input, processing the predetermined selectable object.

14. A handheld electronic device comprising:
a housing including a front, a back and first and second opposing sides extending between the front and the back;
a processor apparatus disposed within the housing, the processor apparatus comprising a processor and a memory;
a resilient membrane disposed within an aperture on a corresponding one of the first and second opposing sides of the housing; and
an input apparatus cooperable with the processor, the input apparatus comprising a number of input members, at least a portion of the input members of the number of input members being movable among an unactuated position, a first actuated position, and a second actuated position in order to provide input to the processor,
wherein the processor is adapted to detect a first input from a first input member of the number of input members and, responsive to detecting the first input, to perform a first navigational function at a first speed,
wherein the processor is adapted to detect a second input from the first input member and, responsive to detecting the second input, to perform the first navigational function at a second speed, the second speed being different than the first speed,
wherein at least some of the input members of the number of input members are disposed on the resilient membrane on the corresponding one of the first and second opposing sides of the housing,
wherein the first navigational function is performable at the second speed upon detecting as the second input an actuation of the first input member from the unactuated position directly to the second actuated position.

15. The handheld electronic device of claim 14 wherein the number of input members includes a second input member; and wherein the processor is adapted to detect a third input from the second input member and, responsive to detecting the third input, to perform a second navigational function at a third speed.

16. The handheld electronic device of claim 15 wherein the processor is adapted to detect a fourth input from the second input member and, responsive to detecting the fourth input, to perform the second navigational function at a fourth speed.

17. The handheld electronic device of claim 16 wherein the memory includes a plurality of routines representative of selectable objects, the first navigational function being a scrolling operation among the plurality of selectable objects,
wherein the processor is adapted to detect a termination of the first and second inputs and, responsive to detecting the termination of the first and second inputs, to terminate the scrolling operation at a predetermined selectable object of the selectable objects.

18. The handheld electronic device of claim 17 wherein the processor is adapted to detect a selection input from a third input member and, responsive to detecting the selection input, to execute the routine representative of the predetermined selectable object.

19. The handheld electronic device of claim 14 wherein the input apparatus further comprises:
a communications element disposed within the enclosure proximate the aperture, the communications element including a plurality of electrical contacts in communication with the processor, and
a number of conductors, at least a first conductor of the number of conductors being disposed on one of the resilient membrane, one of the number of input members, and the communications element, the at least a first conductor being structured to be engaged with another one of the resilient membrane, the one of the number of input members, and the communications element,
wherein, responsive to being engaged, the at least a first conductor is structured to electrically, conductively connect a set of the plurality of electrical contacts to generate the input to the processor.

20. The handheld electronic device of claim 19 wherein the communications element is a printed circuit board; wherein the at least a first conductor includes at least a first dome conductor disposed on the printed circuit board and at least a second conductor disposed on the resilient membrane, the at least a first dome conductor being deflectable between an undeflected position and a deflected position corresponding to the first actuated position in which the dome conductor is structured to electrically, conductively connect a first set of the plurality of electrical contacts on the printed circuit board; and wherein the resilient membrane and the at least a second conductor disposed thereon are deflectable between an undeflected position and a deflected position corresponding to the second actuated position in which the second conductor is structured to electrically, conductively connect a second set of the plurality of contacts.

* * * * *